United States Patent [19]

Turner

[11] 4,034,443
[45] July 12, 1977

[54] KNOT-TYING DEVICE

[76] Inventor: Roland P. Turner, 3224 Harding St., Hollywood, Fla. 33021

[21] Appl. No.: 473,696

[22] Filed: May 28, 1974

Related U.S. Application Data

[63] Continuation of Ser. No. 288,510, Sept. 13, 1972, abandoned.

[51] Int. Cl.² .......................................... F16G 11/14
[52] U.S. Cl. ............................ 24/129 R; 24/129 B
[58] Field of Search ......... 24/129 B, 129 A, 129 R, 24/18; 224/56; 248/328

[56] References Cited

U.S. PATENT DOCUMENTS

| 115,826 | 6/1871 | Creed | 24/129 B |
|---|---|---|---|
| 332,271 | 12/1885 | Michaelis | 24/129 B |
| 366,971 | 7/1887 | Michaelis | 24/129 B |
| 377,063 | 1/1888 | Chambard | 24/129 R |
| 456,210 | 7/1891 | Young | 24/129 R |
| 551,836 | 12/1895 | Provan | 24/129 B |
| 585,564 | 6/1897 | Freeman | 24/129 R |
| 614,621 | 11/1898 | Palmer | 24/129 R |
| 987,407 | 3/1911 | Scott | 24/129 R |
| 1,306,369 | 6/1919 | Bell | 24/129 B |
| 1,565,041 | 12/1925 | Arney | 24/129 R |
| 1,613,635 | 1/1927 | Zimmerlund | 24/129 B |
| 2,934,301 | 4/1960 | Langert | 248/328 |

FOREIGN PATENT DOCUMENTS

| 1,098,683 | 2/1961 | Germany | 24/129 B |
|---|---|---|---|
| 38,666 | 4/1915 | Sweden | 24/129 R |
| 80,919 | 4/1919 | Switzerland | 24/129 R |

Primary Examiner—Bernard A. Gelak
Attorney, Agent, or Firm—Malin & Haley

[57] ABSTRACT

A knot-tying device for securing a loop in a line or cord between the free end and an intermediate portion of the line comprising a rigid tapered body member having a plurality of apertures, one aperture adjacent the apex of the body and the other substantially in the center of the body. An intermediate portion of the line is looped through the center aperture and secured about each tapered side. The free end of the line is coupled through the apex aperture, thus forming a loop in the line between the free end and the intermediate portion of the line. The divergent body prevents accidental disengagement of the intermediate line portion.

3 Claims, 9 Drawing Figures

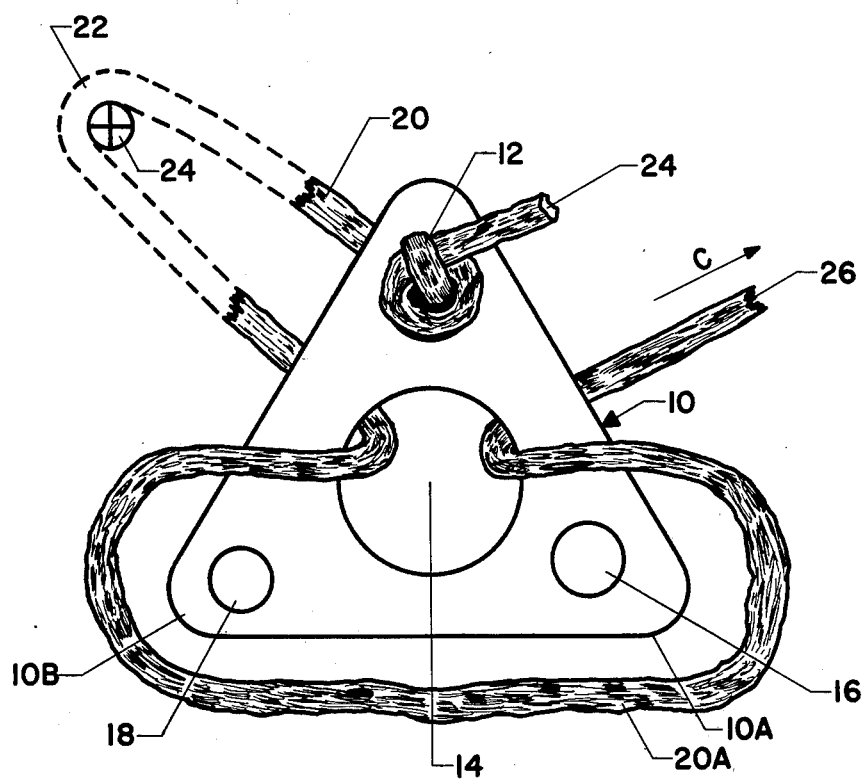

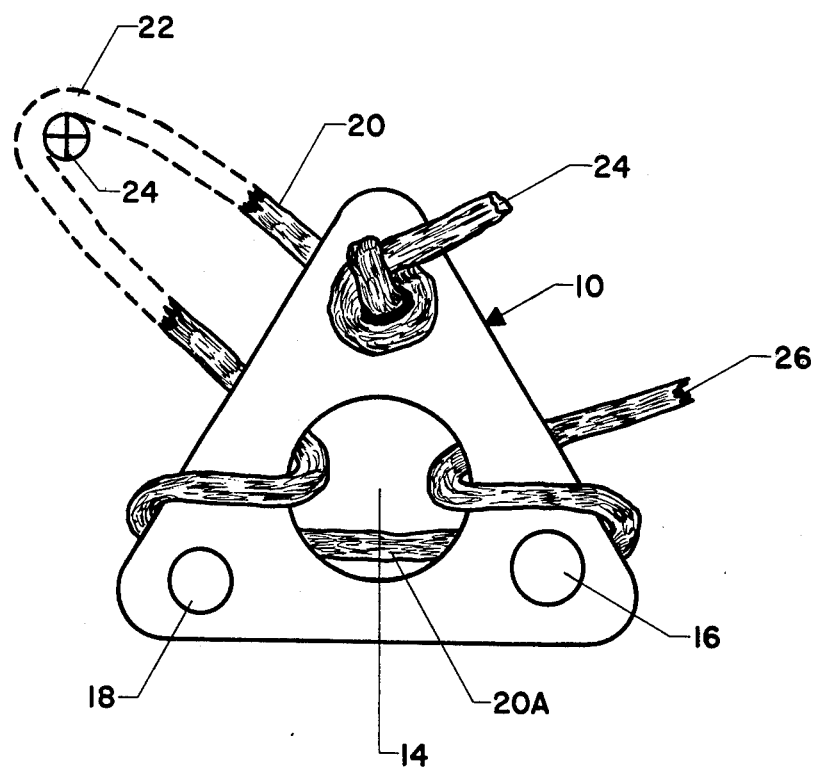

KNOT-TYING DEVICE

This is a continuation of application Ser. No. 288,510, filed Sept. 13, 1972, now abandoned.

BACKGROUND OF THE INVENTION

This invention relates generally to a rope-tying device, and more specifically to a device for securing a loop in one end of a line, cord, or rope, whereby ready and quick attachment and detachment of the cord or rope from a post, rail, cleat, or other fixed point by unsecuring the loop is readily permitted. The device has utility substantially in any situation where it is desirable to be able to quickly but securely attach a line to a fixed point by means of a loop in the line.

In the past, when tying up to a fixed object with a rope, line, or cord, it has been necessary to provide a loop about the fixed object which is secured by a knot, such as a bow-line. For each detachment or attachment the knot must be untied or tied, which requires time, skill in knot-tying, and often times makes removal of the loop cumbersome because the knot may be tied too tightly, incorrectly, or be wet. This is a common problem in securing a small boat to a mooring post.

Applicant's novel device overcomes these problems by providing a device which readily and easily will secure a loop in a line to provide a quick and ready attachment of the loop under all situations while preventing accidental disengagement of the loop.

BRIEF DESCRIPTION OF THE INVENTION

A device for securing a loop in a line, cord, or rope comprising a tapered, rigid body member having a plurality of apertures, the first aperture positioned adjacent the apex of the body for securing the free end of the line to the body, and a second aperture centrally disposed in the body for receiving an intermediary portion of the line, which is wrapped about the tapered side and the aperture wall on each side of the body member. The body member sides diverge away from the apex. The diverging edges retain the wrapped intermediary portion of the line, preventing it from accidentally sliding down over the enlarged end portion of the body member, thereby preventing the unintentional removal of the line from the body member itself. The intermediary portion of the line is looped through the center aperture and then wrapped about each tapered side of the device. A plurality of apex apertures of varying diameters are provided so that ropes or lines of varying diameters may be utilized.

It is an object of the present invention to provide a loop securing device utilized with the free end of the rope, cord or line to permit ready, quick attachment and detachment of the rope from an encircled fixed object.

It is another object of this invention to provide a device for securing a loop in a line or rope which eliminates the necessity of tying or untying knots for securing a loop on a line.

In accordance with these and other objects which will be apparent hereinafter, the instant invention will now be described with particular reference to the accompanying drawing.

BRIEF DESCRIPTION OF THE DRAWINGS

FIG. 4 shows a front elevation of one embodiment of Applicant's invention in a first step of securing a line through Applicant's invention.
FIG. 5 shows a front elevation of Applicant's invention in a second step of securing a line to Applicant's device.

PREFERRED EMBODIMENT OF THE INVENTION

Figure 2:
FIG. 2 is a side elevation of Applicant's invention.
Figure 1:
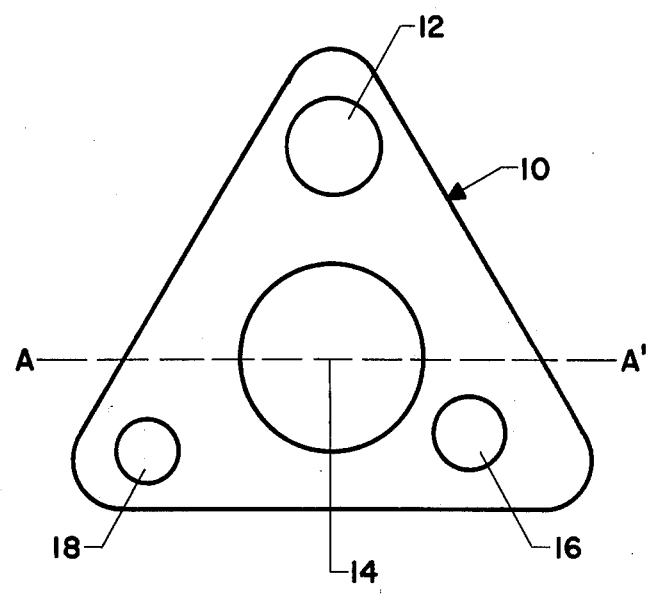
FIG. 1 is a front elevation of Applicant's invention.

Referring now to the drawings, in particular FIG. 1, Applicant's device 10 show comprised of equilaterally shaped triangular plate having a central aperture 14 and a plurality of apex apertures 12, 16, and 18, each disposed adjacent a different apex of the body 10. The diameters of the apex apertures 12, 16, and 18 vary in size to accommodate cord or rope of varying diameters. FIG. 2 shows side view of Applicant's device 10 being flat and plate-like.

Figure 3:
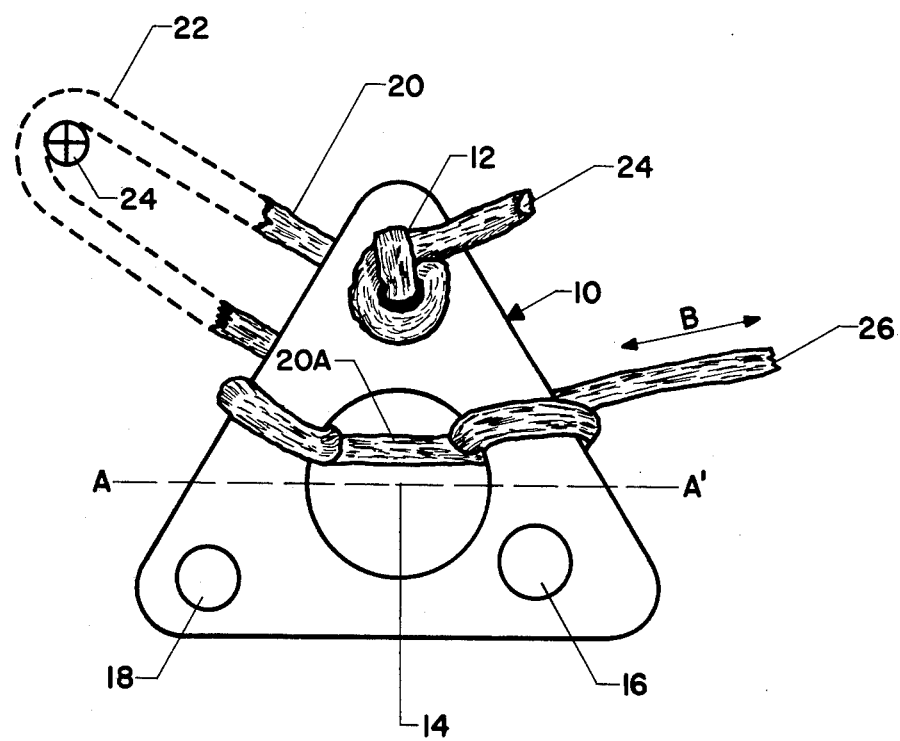
FIG. 3 shows a front elevation of Applicant's invention secured to a line.

FIG. 3 shows Applicant's device 10 having a rope 20 secured through aperture 12 at the free end of the rope 24. A loop shown dotted 22 is secured about a fixed object represented at 24. The intermediate portion of the line ending at 26 is secured about the tapered edges of the body 10 diverging away from aperture 12 through central aperture 14. Rope end 26 represents the opposite end of the rope that is secured to a boat or other object by a knot or with another of Applicant's rope tying devices. The intermediary portion of the line 20A is wrapped about each diverging side of the body 10 and through aperture 14. In order for the line 20 to be disengaged from the body member 10, intermediary portion 20A must be pulled over the enlarged base portion of the body. Movement of the line segment downward from aperture 12 which is looped about the tapered body sides through the center aperture increases tension on line portion 20A and thus increases the frictional engaging force of the engaged line segment on the walls of the aperture thereby preventing accidental external removal of the line portion 20A from the device 10.

To secure the line to the device 10 (FIG. 4) the line is knotted at the free end 24 adjacent the aperture 12 and pulled through the aperture 12 and looped (dotted 22) about a fixed object 24. The intermediary portion of the line, such as 20A is then pulled through center aperture 14 and enlarged to fit about the base end of triangular body 10. The intermediary portion is then pulled over the ends 10A and 10B and around the back of the plate (FIG. 5) and the loops through the aperture and about the tapered edges are tensioned by pulling on the segment of the line 26 until intermediary portion 20A is securely coupled to body member 10. At this time, the intermediary portion 22 is securely held in place and will not accidentally be disengaged while remaining about a fixed object 24 regardless of motion of the line, the device, or the object tied to the end portion 26.

Figure 7:
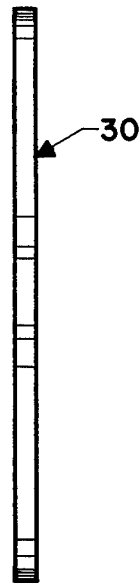
FIG. 7 shows a side elevation of the alternate embodiment of Applicant's invention shown in FIG. 6.
Figure 6:
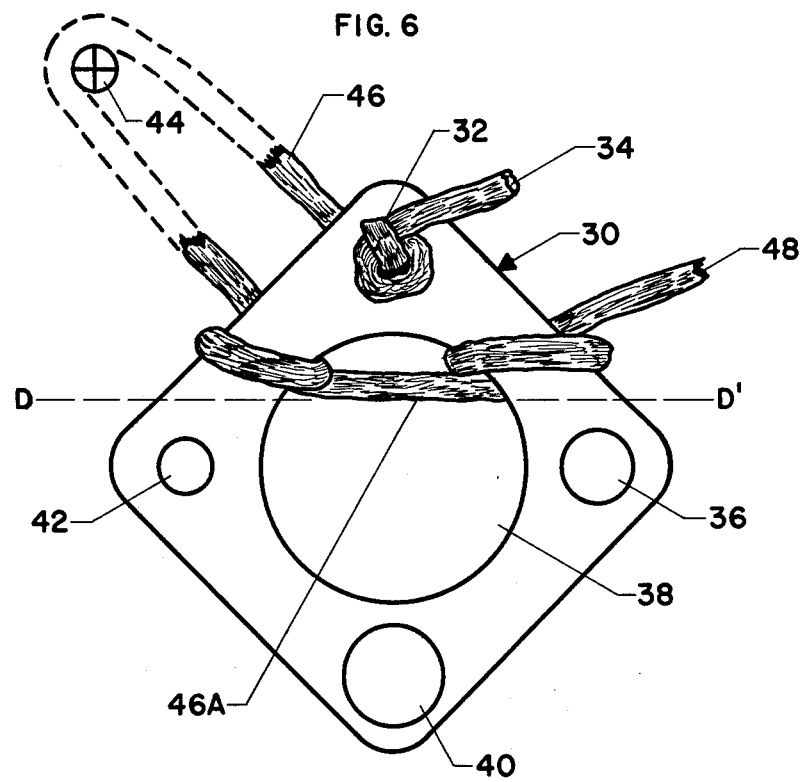
FIG. 6 shows a front elevation of an alternate embodiment of Applicant's invention.

FIG. 6 shows an alternate embodiment of Applicant's invention 30 which is rectangular or square in shape. It has four apex apertures 32, 36, 40 and 42 disposed adjacent to the corners of the body 30 and a central aperture 38. The free end 34 of line 46 is drawn through aperture 32 is knotted and secured to the body member 30. It is then looped (shown dotted) about fixed object 44 and the intermediary portion of the line 46A is drawn through aperture 38 and wrapped about tapered side edges of body 30 above line D-D1. Again the tapered side engaged with intermediary portion of the line 46A will prevent the line from accidentally being slipped about the end portion of the body 30. Apertures 32, 36, 40, 42 are of varying diameters in order to accommodate lines of different diameters. FIG. 7 shows a side view (device 30) that is essentially flat and planar.

Figure 8:
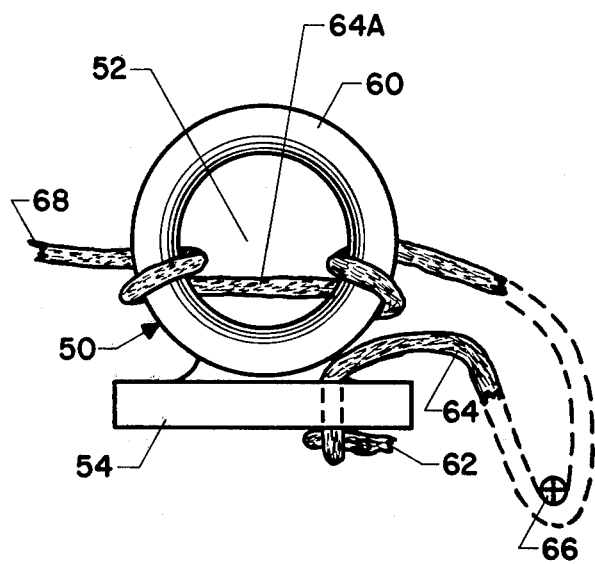
FIG. 8 shows yet another alternate embodiment of Applicant's invention in front elevation.
Figure 9:
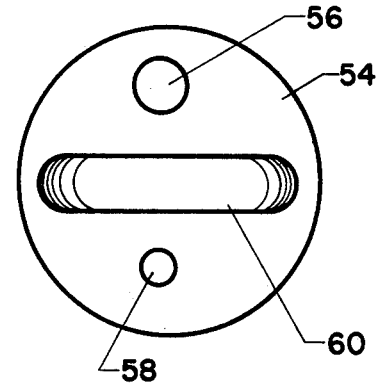
FIG. 9 is a plan view of the alternate embodiment of Applicant's invention shown in FIG. 8.

FIG. 8 shows another embodiment of Applicant's invention in which a ring 60 is disposed at right angles to a disk plate 54 having apertures 56 and 58 at different diameters. A line 64 is secured through an aperture such as 56 and tied at the opposite side away from ring 60 in a knot at the free end 62 and secured about a fixed object 66 in a looped fashing (shown dotted). The intermediary portion is then drawn through ring 60 (which is aperture 52) and placed about the sides of the ring. Again the ring provides a diverging edges away from the secured free end that prevents the line 64A from being pulled over the end ring 60 thus preventing its disengagement from the ring.

Applicant's device may be used whenever it is desirable to quickly and readily retain a loop in a line that cannot be accidentally or unintentionally removed from the line for securing movable objects such as a boat or the like to a fixed object.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A device in combination with a flexible line for securing a loop in one free end of said flexible line, said combination comprising:

a body member, said body member having a means for attaching the free end of said flexible line to said body member and said body member having a loop receiving aperture and at least two peripheral surface portions, each peripheral surface portion being disposed on opposite sides of said loop receiving aperture, said two peripheral surface portions being angularly disposed relative to each other such that relative to the means for attaching said line to said body on an axis towards said loop receiving aperture said peripheral side surface portions have an angular relative position which diverges away from when taken with said means for attaching said free end of said line to said body member; and a flexible line having its free end connected to said means for attaching said free end of said line to said body portion and an intermediate segment of said flexible line having a loop portion received through said loop receiving aperture and connected back between said divergent peripheral surface portions such as to be looped about each peripheral surface portion, whereby a loop in said flexible line is secured between said free end connected to said body member and said intermediate line segment connected to said angularly diverging peripheral surface portions.

2. In combination, a device, as in claim 1, wherein: said body member is triangular in shape.

3. A device, as in claim 2, wherein: said body member line attaching means is an aperture in said body member.

* * * * *